(12) United States Patent
Chandra et al.

(10) Patent No.: US 6,308,074 B1
(45) Date of Patent: Oct. 23, 2001

(54) HANDS-FREE PERSONAL COMMUNICATION DEVICE AND POCKET SIZED PHONE

(75) Inventors: Sunil Chandra, Sunnyvale; John P. Fairbanks, Stockton; Jon C. Taenzer, Los Altos; Steven H. Puthuff, Saratoga; Arthur W. Astrin, Palo Alto; Patrick A. Mavrakis, Newark, all of CA (US)

(73) Assignee: ReSound Corporation, Redwood City, CA (US)

( * ) Notice: Subject to any disclaimer, the term of this patent is extended or adjusted under 35 U.S.C. 154(b) by 0 days.

(21) Appl. No.: 09/128,279

(22) Filed: Aug. 3, 1998

(51) Int. Cl.[7] ....................................................... H04Q 7/20
(52) U.S. Cl. ........................... 455/462; 455/575; 455/90; 455/573; 455/557; 455/351; 455/100
(58) Field of Search ............................... 455/575, 90, 550, 455/573, 569, 572, 349, 462, 557, 351, 100; 379/433, 455; D14/138, 248, 251, 253

(56) References Cited

U.S. PATENT DOCUMENTS

| | | | | |
|---|---|---|---|---|
| 5,259,020 | * | 11/1993 | Hirano | 379/61 |
| 5,793,865 | * | 7/1999 | Leifer | 379/439 |
| 5,930,719 | * | 7/1999 | Babitch et al. | 455/462 |

OTHER PUBLICATIONS

Radio Shack American Technology Store 1992 Catalog, pp. 85, 86.*

* cited by examiner

*Primary Examiner*—William Trost
*Assistant Examiner*—Philip J. Sobutka
(74) *Attorney, Agent, or Firm*—Burns Doane Swecker & Mathis

(57) ABSTRACT

A tetherless handset telephone with an earpiece connection port is disclosed. The handset is small in size and has an internal antenna. Thus, the handset can easily be placed within the user's pocket. A belt carrier for use with the handset holds the handset upside-down with the connection port easily accessible. The handset is arranged so that it can be cradled within a base unit and recharged while the handset is face-up.

17 Claims, 3 Drawing Sheets

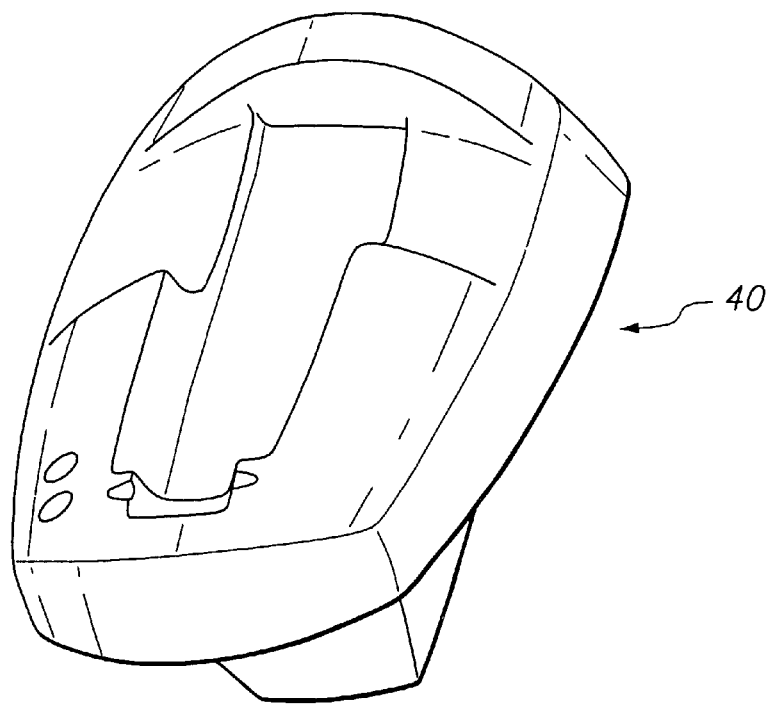
FIG. 1A
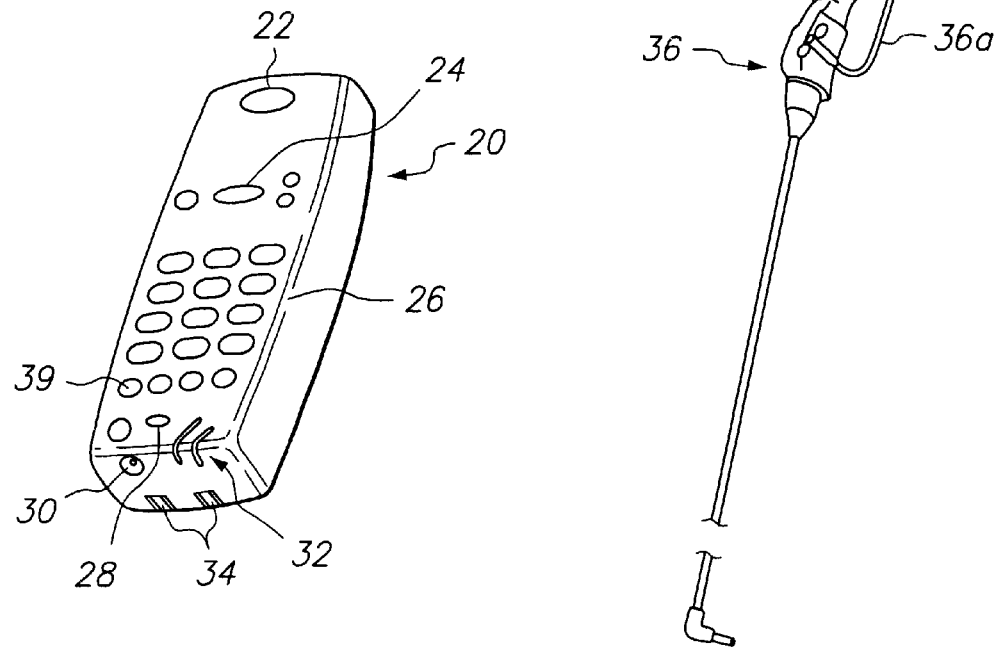
FIG. 1B
FIG. 1C

HANDS-FREE PERSONAL COMMUNICATION DEVICE AND POCKET SIZED PHONE

BACKGROUND OF THE INVENTION

1. Field of the Invention

The present invention relates to cordless phone systems.

2. State of the Art

Cordless phone systems are popular for household use. Cordless phone systems typically have a handset which communicates by wireless communication to a base unit. The base unit is connected to phone lines and to power and is used to provide a connection to a public switched telephone system and to recharge the handset battery. The communication between the handset and the base unit, for example, can use 900 MHZ spread spectrum radio frequency signals to communicate distances of up to about 1000 ft.

It is desired to have an improved cordless phone system.

SUMMARY OF THE INVENTION

The cordless phone system of the present invention provides a continuously portable cordless phone. Unlike other cordless phone systems that are designed to be returned to a base unit for recharging after each use, the present invention provides a handset that can be carried along with the user for continuous use, especially with a headset or earpiece.

In one preferred embodiment, the handset has an internal antenna for wireless communication with the base unit and the handset is less than 5 inches long, fully extended. The small size of the handset means that the handset can be conveniently carried by the user. For example, the handset can be carried in the user's pocket, at the user's belt or in a lanyard around the user's neck. The internal antenna aids in the ease of carrying the handset. External antennas, even extendable external antennas, can accidentally poke the user when carried near the user's body. By combining the small size and the internal antenna, the handset of the present invention can be comfortably carried by the user for long periods of time.

The handset preferably has a connection port to operably connect the handset to a headset or an earpiece microphone/speaker. The headset or earpiece can be worn all day long as the user receives and makes phone calls. In one embodiment, the connection port is a jack connection port that allows connection to a jack of the headset or earpiece. Prior cordless phones have been relatively bulky and thus would be cumbersome to use with a jack connection to a headset or earpiece. In another embodiment, the connection port is a wireless connection port that provides for wireless communication between the handset and the headset or earpiece.

In another embodiment, a handset is designed so that it can fit into a small carrier which can be connected to the user's belt. The carrier aids in the portability of the handset. The carrier is preferably adapted so that the phone can fit upside-down in the carrier. The connection port is positioned so that it sticks out the top of the carrier when the phone is placed in the carrier upside-down. The user can tip the carrier upward in order to make phone calls, while keeping the handset in the belt carrier. In one preferred embodiment, the carrier is such that the on/off button of the handset can be easily selected when the handset is in the carrier. The carrier is preferably scooped out so that buttons near the on/off button are-covered by the carrier and has a curved portion to direct the user's fingers to the on/off button. When a call is received, the user can quickly press the on/off button without looking at the handset. In a preferred embodiment, indicator lights are positioned on the same end of the handset as the connection port so that the indicator lights are visible when the handset is in the carrier. The indicator lights are preferably positioned both along the bottom and along the front of the handset so that the indicator lights can be seen both by the user looking down at the handset, and by another person looking at the user.

The cordless telephone system also preferably has other features that aid in the continuous portable use of the handset. For example, the handset batteries preferably provide for a long period of use between recharges. The battery pack of the handset is preferably easily replaceable because of this heavy battery use between recharges. The handset also preferably produces tones when the buttons are pressed so that a display need not be provided or used. The on/off button is preferably centrally located on the handset, for left- or right-handed use, and larger than the other handset buttons, or easily identifiable by touch, to make it easy to locate the on/off button without looking at the handset. The handset is also preferably light-weight to aid in the handset's portability.

In another embodiment, the handset can be cradled on the base unit with the handset's keyboard facing outward. This allows for the recharging of the handset battery in the base unit while the phone is used. This embodiment is especially valuable when the handset is used with a headset or earpiece. The connection port of the handset is preferably easily accessible while the handset is cradled in the base unit.

BRIEF DESCRIPTION OF THE DRAWING

The present invention may be further understood from the following description in conjunction with the appended drawing. In the drawing:

FIG. 1A is a perspective view of a base unit of the present invention;

FIG. 1B is a perspective view of a handset of the present invention;

FIG. 1C is a perspective view of an earpiece that can be used with the handset of the present invention;

DETAILED DESCRIPTION OF THE PREFERRED EMBODIMENT

Figure 2:
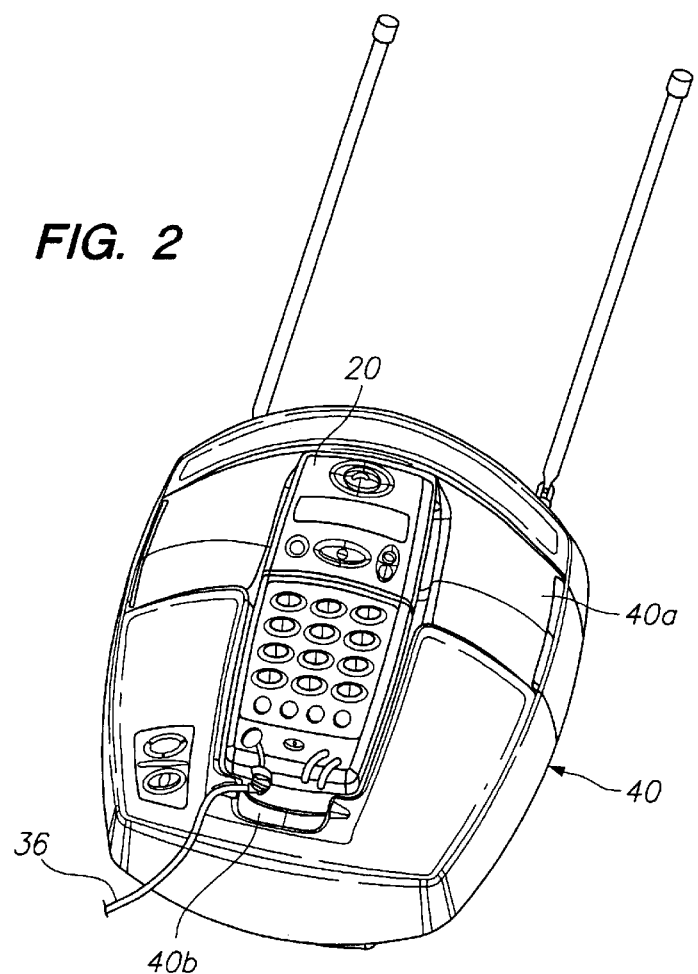
FIG. 2 is a perspective view showing the handset cradled in the base unit while the jack of a earpiece is connected the handset.

FIGS. 1A–1C illustrate the cordless phone system of a preferred embodiment. The handset 20 preferably has a speaker 22, an on/off button 24, a keypad region 26, a microphone 28, a jack connection port 30, LED indicator lights 32, and battery recharge ports 34. The handset in the preferred embodiment is small, less than five inches in length. In a more preferred embodiment, the handset is less than four inches in length. The small size of the handset makes it easy for the user to carry the unit continuously. For the same reason, the handset is light-weight, preferably less than 120 grams. The handset 20 preferably has an internal antenna to keep the size of the handset small and avoid projections that can poke at the user. The handset also preferably does not have a flip-down portion that would add to the fully extended length of the handset.

The jack connection port can be for a normal headset, or the earpiece 36 shown in FIG. 1C. The earpiece 36 shown in FIG. 1C has a speaker connected to extension 36*a*, and a microphone pickup in the base unit 36*b*. The earpiece 36 is described in detail in the patent application "Two-Way Communication Earpiece", inventors Steven H. Puthuff, et al., Ser. No. 09/121,208, filed Jul. 22, 1998, which is incorporated herein by reference. The connection port can also be of the type that an provide wireless communication from the handset to the earpiece or headset. This wireless link is distinct from the wireless link from the handset to the base station. For example, the link between the handset to the earpiece or headset can be done at 5.8 GHz as opposed to the 900 MHZ spread spectrum link between the handset and base unit. A wireless earpiece that can be used with this embodiment is described in detail in the patent application "Wireless Open Ear Canal Earpiece", inventors Steve Puthuff, Vincent Pluvinage, and Jon C. Taenzer, Ser. No. 08/833,068, filed Apr. 3, 1997, which is incorporated herein by reference.

In the past, most consumers were comfortable with a relatively large handset of about seven inches in length where the microphone to speaker distance almost completely covers the distance between a typical user's mouth and ear. In order to keep the handset of the present invention sufficiently portable, the present handset is significantly smaller than this length. Because of the small size of the handset, the microphone of the handset can be some distance from the user's mouth. For this reason, the microphone 28 is preferably a directional noise reduction microphone that produces a directional preference for sound from the user's mouth.

The on/off button 24 is preferably the largest of the headset buttons and centrally located. Both features aid in the ease of switching the phone on when a call is received. The recharge ports 34 allow the handset to be recharged in the base unit 40. The jack connection region 30 preferably provides a stiff connection to hold the jack still and reduce the wear on the jack and jack connection port. Button 39 on the handset 20, can be used for volume control. In one embodiment, there is a dual volume control, one control for the handset speaker volume, and one control for the earpiece volume. This could be implemented using two different buttons on the front of the handset, or a single button on the front of the handset and a relatively inaccessible switch that controls the bias between the loudness of the earpiece and handset speaker. This would allow one user to use an earpiece at a given volume, and another user to use the handset at another volume. The handset preferably beeps to indicate that a button is pressed. This aids in the use of the buttons without looking at the handset. The handset may optionally have a display for caller I.D. or other features.

Base unit 40 shown in FIG. 1A is used for the wireless communication with the handset 20. The handset 20 is cradled in the base unit 40 to recharge the batteries. Additionally, the base unit 20 preferably has another battery recharge port for simultaneously recharging a replacement battery pack of the handset.

FIG. 2 illustrates the handset 20 cradled face-up on the base unit 40. By cradling the handset 20 face up, the user is able to make calls using the handset 20 while the handset 20 is being recharged by the base unit 40. The handset can be connected to the earpiece 36 at a jack connection port or through a wireless connection port. The base unit also has a relief section 40*b* that allows for the accessibility of the connection port while the handset is cradled in the base unit. For example, an earpiece jack can be easily placed in a jack connection port of the handset at the relief section 40*b*. Portion 40*a* allows for the handset to be easily put in and out of the base unit 40 by hand.

Figures 3A, 3B, 3C:
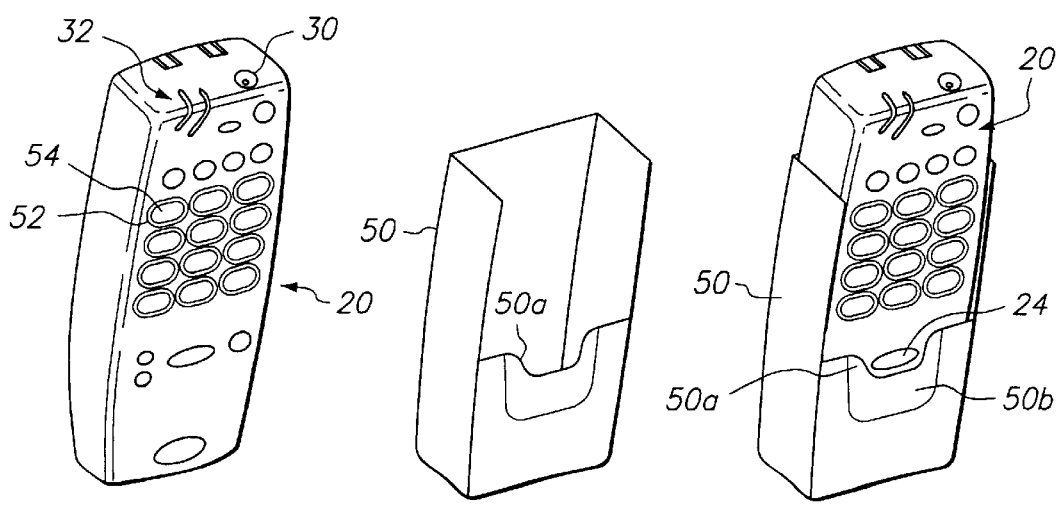
FIG. 3A is a perspective view of an upside-down handset.
FIG. 3B is a perspective view of a carrier for the handset of FIG. 3A.
FIG. 3C is a perspective view of the handset of FIG. 3A positioned in the carrier of FIG. 3B.

FIGS. 3A–3C illustrate the use of the handset 20 with the carrier 50. The handset is preferably arranged so that it can be flipped upside-down and placed in the carrier 50. By having the handset upside-down, the connection port and LED indicator lights 32 are easily accessible. Thus, the user can have the handset in the carrier 50 while easily connecting and disconnecting an earpiece jack to a jack connection port 30.

FIG. 3C shows the handset 20 positioned in the carrier 50. The carrier has an edge 50*a* that scoops around the buttons of the phone to allow easy access to, for example, the on/off button 24. The carrier 50 can also have a curved portion 50*b*, that directs the user's hand to the on/off button. This aids in the use of the phone without looking at the handset when a call is received. In order to make a call, the unit can be tilted upward so that the keypad is correctly oriented, the number dialed, and then the unit released while the conversation occurs using the earpiece or a headset.

FIG. 3A also shows the embodiment in which raised ridges 52 are used around the keys 54 of the keypad. The raised ridges 52 prevent the accidental pressing of the buttons of the phone. This can be important when the handset, for example, is placed in a user's pocket, or at the user's belt.

Figure 4:
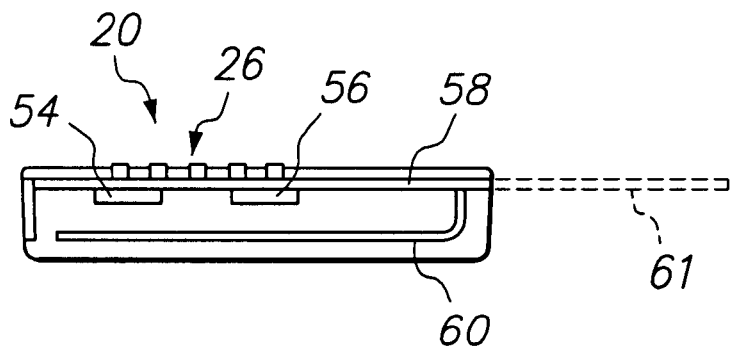
FIG. 4 is a cross-sectional view of the handset of the present invention showing the internal antenna.

FIG. 4 is a cross-sectional view of the handset 20 of the present invention. A chipset including semiconductors 54 and 56 is positioned on a one side of circuit board 50*a*, and the keyboard 26 is positioned on the other side of the circuit board 50*a*. The antenna 60 is an internal antenna positioned within the handset housing rather than in the external position 61 of typical handset antennas.

The internal antenna 60 has the advantage that the antenna will not accidentally bump the user when the phone is stored in a pocket. The use of an internal antenna 60 is not obvious because of the added capacitance that results from positioning the antenna within the housing. The internal antenna 60 is positioned about a fifth of an inch from the elements of the circuit board 50*a*. This produces a parasitic capacitance that increases the power required by the handset or decreases the handset's range. The parasitic capacitance of the internal antenna does, however, have an unexpected advantage. A problem with typical cordless phones is that the handset's reception is better when the phone is away from the user's body than when it is next to the user's body. This is a result of the body capacitance effect. Thus, the phone has a greater range when no one is touching the phone than when someone is holding the phone to their ear. There is a large amount of uncertainty about the actual range of the handset for this reason. Because the internal antenna has a relatively high parasitic capacitance, the addition of the body's parasitic capacitance produces a smaller percentage change than if the body's parasitic capacitance was added to a low capacitance system. For this reason, the body effect is less noticeable with the system using the internal antenna of the present invention than in systems using a handset with an external antenna. This results in more defined range for the handset communication with the base unit.

Figure 5:
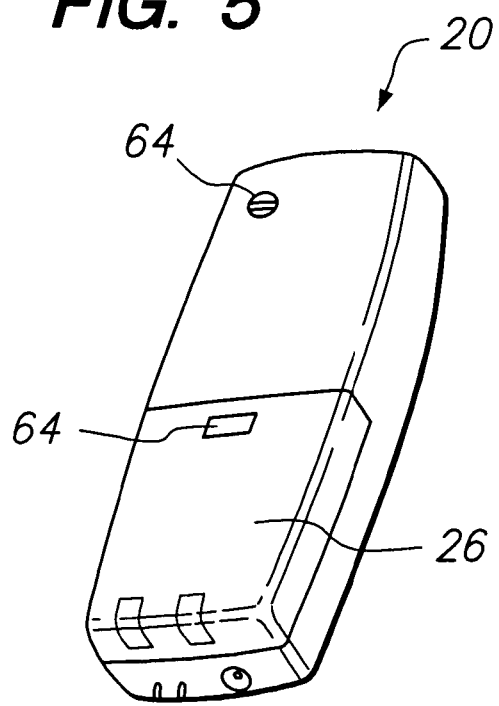
FIG. 5 is a projection view of the rear of the handset of the present invention.

FIG. 5 illustrates a perspective view of the rear of the handset 20 of the present invention. The handset 20 has a detachable battery pack 62. The detachable battery pack can be replaced by removing the battery pack 62 from the handset 20. In a preferred embodiment, the cordless telephone systems have a number of detachable battery packs that can be easily interchanged. As discussed above, the base unit preferably has a separate recharging connection region for recharging a disconnected battery pack at the same time that the battery pack connected to the handset is recharged.

In one embodiment, the battery pack 62 has a meter 64 attached to the battery pack. This allows for the charge level of the battery to be determined while the battery pack is being recharged while disconnected and gives an indication of the battery charge while the battery pack remains connected to the handset 20. Prior art battery meters are connected on the handset only so that the battery charge can't be determined by looking at the battery unit.

FIG. 5 also shows the screw 64 which can be used to set the bias of the earpiece volume with respect to the handset volume. This screw 64 can require a coin or a screwdriver to turn to avoid the user accidentally changing the volume.

It will be appreciated by those of ordinary skill in the art that the invention can be embodied in other specific forms without departing from the spirit or essential character thereof. Presently disclosed embodiments are therefore considered in all respects to be illustrative and not restrictive. The scope of the invention is indicated by the appended claims, rather than the foregoing description, and all changes which come within the meaning and range of equivalence thereof are intended to be embraced therein.

What is claimed is:

1. A cordless telephone system comprising:
   a base unit; and
   a telephone handset operable for wireless communication to the base unit, the handset having a housing and an antenna internal to the housing, the handset, fully extended, being less than 5 inches long; and
   a belt carrier, the handset being positionable in the belt carrier so that it holds the handset upside-down such that the connection port is adjacent to the top of the belt carrier.

2. The cordless telephone system of claim 1, wherein the belt carrier has a curved portion surrounding the position corresponding to the on/off switch on the handset to guide the user to the on/off switch of the handset.

3. The cordless telephone system of claim 1, wherein the connection port is a jack connection port, the cordless telephone system further comprising an earpiece connectable to the connection port of the handset by a jack.

4. The cordless telephone system of claim 1, wherein the connection port is a wireless connection port, the cordless telephone system further comprising an earpiece adapted for wireless communication to the wireless connection port.

5. The cordless telephone system of claim 1, wherein the handset is 4 or less inches long.

6. The cordless telephone system of claim 1, wherein the handset has a keypad and wherein there are raised regions on the handset that surround the keys of the keypad.

7. The cordless telephone system of claim 1, wherein the handset has an on/off button that is larger than other buttons on the handset and centrally located on the handset.

8. The cordless telephone system of claim 1, wherein the pick-up microphone is a noise reduction microphone.

9. The cordless telephone system of claim 1, wherein the handset has a detachable battery, wherein the detachable battery has a charge indicator that is visible when the detachable battery is connected to the handset.

10. The cordless telephone system of claim 1, wherein the handset has a dual volume control for the speaker and the jack.

11. The cordless telephone system of claim 1, wherein the handset has a keypad, and a battery recharge port, wherein the battery recharge port is positioned so that when the handset is being recharged, the keypad is positioned face-out and the telephone is operable.

12. The cordless telephone system of claim 1, wherein the handset has no flip-down portion.

13. A cordless telephone system comprising:
   a base unit;
   a telephone handset operable for wireless communication to the base unit, the hand set having a keypad, a speaker, a microphone, a battery recharge port and a connection port, wherein the battery recharge port is positioned so that when the telephone handset is being recharged in the base unit, the keypad is positioned face-out and the telephone is operable, wherein the connection port is a jack connection port and the base unit has a jack connection access region allowing the jack to be connected to the handset while the handset is cradled.

14. The cordless telephone system of claim 13, wherein the connection port is a jack connection port, the cordless telephone system further comprising an earpiece connectable to the connection port of the handset by a jack.

15. The cordless telephone system of claim 13, wherein the connection port is a wireless connection port, the cordless telephone system further comprising an earpiece adapted for wireless communication to the wireless connection port.

16. The cordless telephone system of claim 13, wherein the handset is 5 or less inches long.

17. The cordless telephone system of claim 13, wherein the connection port is at the bottom of handset.

* * * * *